(12) United States Patent
Mizuno

(10) Patent No.: US 11,523,451 B2
(45) Date of Patent: Dec. 6, 2022

(54) WIRELESS COMMUNICATION DEVICE, TERMINAL, WIRELESS COMMUNICATION SYSTEM, CONNECTION CONTROL METHOD AND RECORDING MEDIUM

(71) Applicant: CASIO COMPUTER CO., LTD., Tokyo (JP)

(72) Inventor: Kimiyasu Mizuno, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/201,214

(22) Filed: Mar. 15, 2021

(65) Prior Publication Data

US 2021/0298101 A1  Sep. 23, 2021

(30) Foreign Application Priority Data

Mar. 17, 2020  (JP) .............................. JP2020-045902

(51) Int. Cl.
| | | |
|---|---|---|
| *H04W 36/14* | (2009.01) | |
| *H04W 76/14* | (2018.01) | |
| *H04W 4/80* | (2018.01) | |
| *H04W 72/04* | (2009.01) | |
| *H04W 88/04* | (2009.01) | |
| *H04W 8/00* | (2009.01) | |

(52) U.S. Cl.
CPC ............ *H04W 76/14* (2018.02); *H04W 4/80* (2018.02); *H04W 8/005* (2013.01); *H04W 72/0406* (2013.01); *H04W 88/04* (2013.01)

(58) Field of Classification Search
CPC .................................................. H04W 88/06
See application file for complete search history.

(56) References Cited

U.S. PATENT DOCUMENTS

| 10,368,237 B2 * | 7/2019 | Ishimura ............... H04W 12/04 |
| 10,372,190 B1 * | 8/2019 | Kondareddy ......... G06F 1/3209 |
| 10,542,574 B1 * | 1/2020 | Jorgovanovic ........ H04W 76/15 |

(Continued)

FOREIGN PATENT DOCUMENTS

| JP | 2016-015081 A | 1/2016 |
| JP | 2016-059751 A | 4/2016 |
| WO | 2019-069590 A1 | 4/2019 |

*Primary Examiner* — Cindy Trandai
(74) *Attorney, Agent, or Firm* — Seed IP Law Group LLP

(57) ABSTRACT

A wireless communication device includes a communicator and a processor. The communicator which wirelessly communicates with a first communicator of an external device in a first communication standard and which wirelessly communicates with a second communicator of the external device in a second communication standard different from the first communication standard. The processor obtains association between identification information of the first communicator and identification information of the second communicator. To switch a current communicator which is one of the first and second communicators of the external device to a next communicator which is another of the first and second communicators, the processor specifies identification information of the next communicator based on the association, and establishes connection with the next communicator using identification information of the next communicator.

7 Claims, 6 Drawing Sheets

(56) References Cited

U.S. PATENT DOCUMENTS

| | | | |
|---|---|---|---|
| 2006/0223465 A1* | 10/2006 | Akiba | H04W 52/0277 |
| | | | 455/574 |
| 2007/0225032 A1* | 9/2007 | Saito | H04W 60/005 |
| | | | 455/552.1 |
| 2014/0148098 A1* | 5/2014 | Song | H04W 76/14 |
| | | | 455/41.1 |
| 2014/0256256 A1 | 9/2014 | Park et al. | |
| 2015/0043886 A1* | 2/2015 | Bang | G11B 20/10527 |
| | | | 386/223 |
| 2015/0245298 A1* | 8/2015 | Takahashi | H04W 52/0261 |
| | | | 455/574 |
| 2016/0086568 A1 | 3/2016 | Imamura et al. | |
| 2016/0269946 A1* | 9/2016 | Park | H04B 5/0031 |
| 2016/0283175 A1* | 9/2016 | Nakahara | G06F 3/1236 |
| 2017/0223615 A1* | 8/2017 | Lee | H04W 48/14 |
| 2017/0286026 A1* | 10/2017 | Ito | H04W 12/062 |
| 2018/0020322 A1* | 1/2018 | Fukuda | H04W 4/02 |
| 2018/0027144 A1* | 1/2018 | Yokoyama | H04N 1/00893 |
| | | | 358/1.13 |
| 2018/0158321 A1* | 6/2018 | Choi | G08C 17/02 |
| 2018/0285039 A1* | 10/2018 | Kawai | H04W 4/80 |
| 2019/0265923 A1* | 8/2019 | Ikeda | G06F 3/1226 |
| 2019/0357277 A1* | 11/2019 | Park | H04B 7/26 |
| 2020/0296546 A1 | 9/2020 | Sawai | |
| 2021/0204177 A1* | 7/2021 | Bernsen | H04W 4/80 |

\* cited by examiner

| GROUP ID | IDENTIFICATION INFORMATION | COMMUNICATION SYSTEM | PAIRING (BONDING) INFORMATION |
|---|---|---|---|
| 0x0001 | 0x123456789abc | BT | x1, y1, z1, ... |
|  | 0x123456789fed | BLE | x2, y2, z2, ... |
| 0x0002 | 0x1278de02468a | BT | x3, y3, z3, ... |
|  | 0x1278de048c15 | BLE | x4, y4, z4, ... |

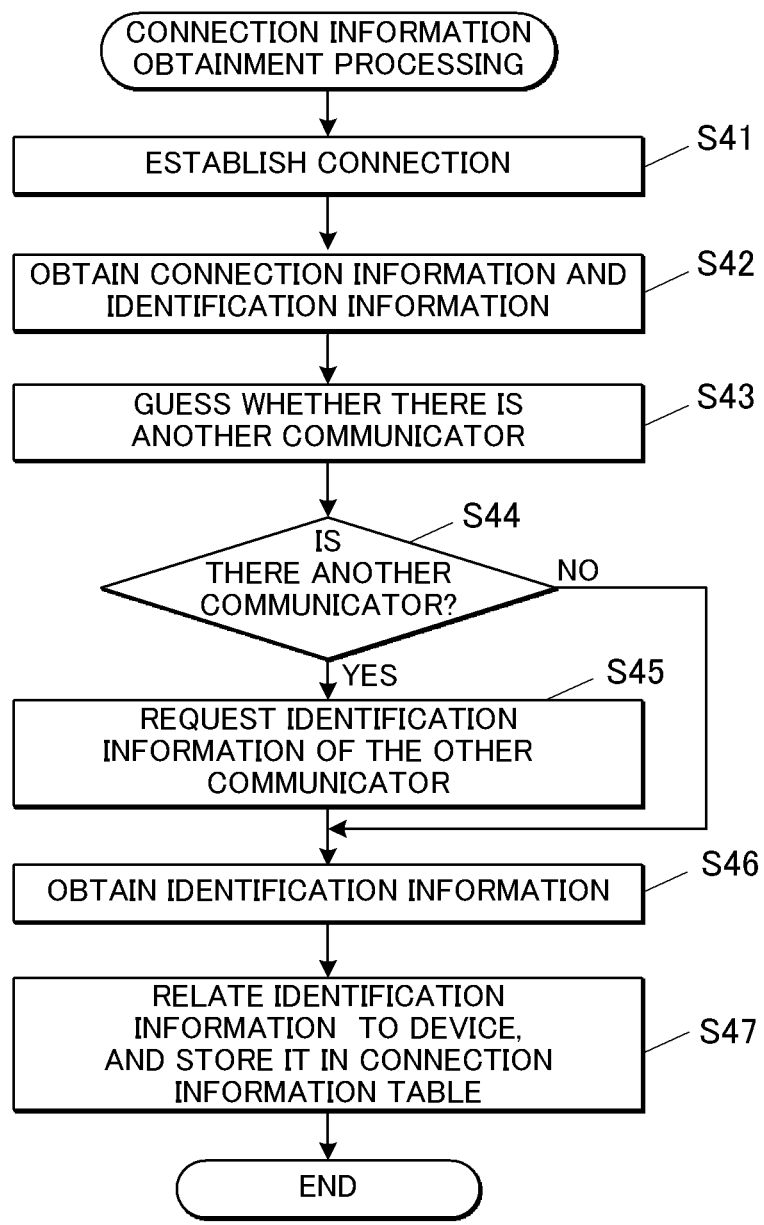

WIRELESS COMMUNICATION DEVICE, TERMINAL, WIRELESS COMMUNICATION SYSTEM, CONNECTION CONTROL METHOD AND RECORDING MEDIUM

CROSS REFERENCE TO RELATED APPLICATION

This application is based upon and claims the benefit of priority under 35 USC 119 of Japanese Patent Application 2020-045902 filed on Mar. 17 2020, the entire disclosure of which, including the description, claims, drawings, and abstract, is incorporated herein by reference in its entirety.

BACKGROUND OF THE INVENTION

1. Field of the Invention

The present invention relates to a wireless communication device, a terminal, a wireless communication system, a connection control method, and a recording medium.

2. Description of Related Art

Some wireless communication devices can connect with external electronic devices in a plurality of wireless communication systems. Wireless communication systems have various characteristics. In some systems, data is transmitted at high speed, but communication usage is high. In some systems, communication is slow and limited, but power consumption is very low.

In portable wireless communication devices, communication usage varies depending on how the device is used. JP2016-59751A discloses an electronic device, in which one internal circuit for low power operation can use Bluetooth (registered trademark) Low Energy (BLE), and another internal circuit for high power operation can use Bluetooth or the like.

SUMMARY OF THE INVENTION

To achieve at least one of the abovementioned objects, according to an aspect of the present invention, a wireless communication device includes:

a communicator which wirelessly communicates with a first communicator of an external device in a first communication standard and which wirelessly communicates with a second communicator of the external device in a second communication standard different from the first communication standard; and at least one processor, wherein the processor obtains association between identification information of the first communicator and identification information of the second communicator, and to switch a current communicator which is one of the first and second communicators of the external device to a next communicator which is another of the first and second communicators, the processor specifies identification information of the next communicator based on the association, and establishes connection with the next communicator using identification information of the next communicator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a flow chart illustrating control procedure of connection information obtainment processing.

FIG. 8 is a table showing another example of the connection information table.

DETAILED DESCRIPTION OF THE PREFERRED EMBODIMENT

An embodiment of the invention will be described with reference to the drawings. However, the scope of the invention is not limited to the disclosed embodiment.

Figure 1:
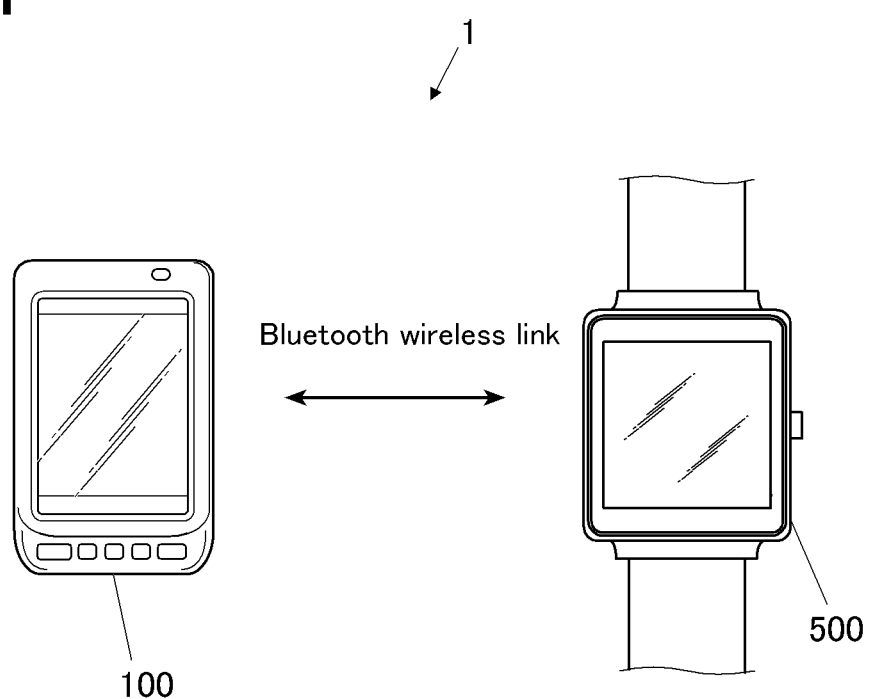
FIG. 1 illustrates a wireless communications system according to an embodiment.

FIG. 1 shows configuration of a wireless communication system 1 according to the embodiment.

The wireless communication system 1 includes an electronic device 100 (wireless communication device) and a terminal 500 (external device). The electronic device 100 is, for example, a portable computer such as a mobile phone. In the embodiment, the terminal 500 is, for example, a smart watch and is carried with a mobile phone or a wearable terminal attached to a body. The electronic device 100 and the terminal 500 communicate with each other in one of standards included in Bluetooth version 3 (Bluetooth Classic; hereinafter referred to as BT) (first communication standard) and in a standard of low energy included in Bluetooth version 4 (Bluetooth Low Energy; hereinafter referred to as BLE) (second communication standard).

In the wireless communication system 1 according to the embodiment, the electronic device 100 operates as a host device (center or master) in BT and BLE. The terminal 500 operates as a terminal (peripheral or slave) in BT and BLE. The present invention is not limited thereto.

Figure 2:
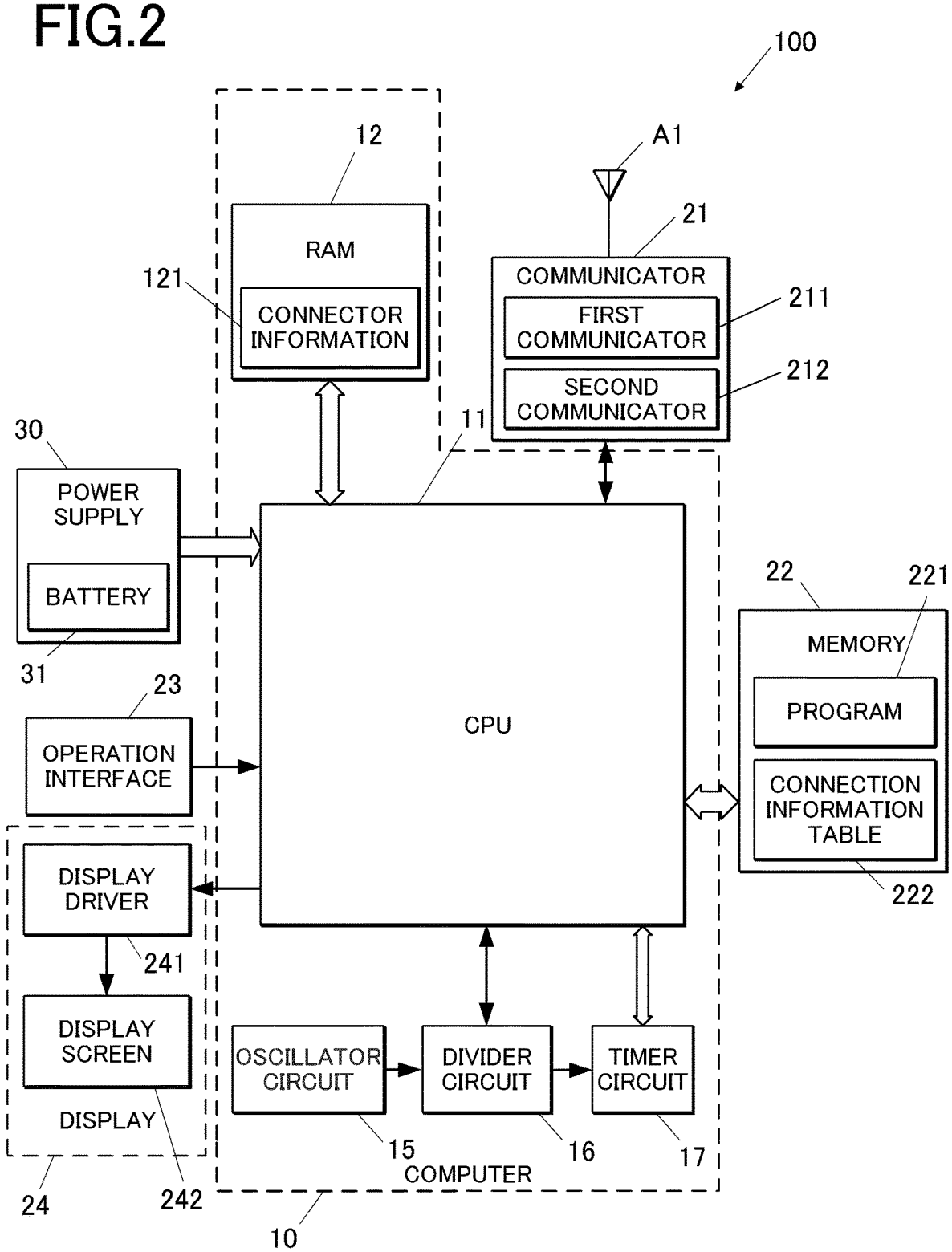
FIG. 2 is a block diagram illustrating functional configuration of an electronic device according to the embodiment.

FIG. 2 is a block diagram illustrating functional configuration of the electronic device 100 according to the embodiment.

The electronic device 100 includes a CPU (Central Processing Unit) 11 (at least one processor), RAM (Random Access Memory) 12, an oscillator circuit 15, a divider circuit 16, a timer circuit 17, a communicator 21, memory 22, an operation interface 23, a display 24, and a power supply 30.

The CPU 11 is a processor that comprehensively controls all the operations of the electronic device 100. The CPU 11 performs various arithmetic processing to perform control operation.

The control operation includes:

controlling various displays performed by the display 24, such as a date and time based on those counted by the timer circuit 17; and controlling processing of biological information obtained from the terminal 500.

The RAM 12 provides the CPU 11 with working memory space and stores temporary data. The RAM 12 includes, for example, DRAM, and may also include rewritable nonvolatile memory.

The RAM 12 stores connection device information 121. The connection device information 121 includes device identification information of external electronic devices to be connected with the communicator 21 in short-range wireless communication. The external electronic devices include the terminal 500. A necessary piece of the device identification information is read from the connection information table 222 in the memory 22.

The oscillator circuit 15 generates and outputs a signal (clock signal) of a predetermined frequency. For example, a crystal oscillator or a MEMS oscillator (Micro Electro-Mechanical Systems) is used for generating a clock signal.

The divider circuit 16 outputs a divided signal obtained by dividing the clock signal input from the oscillator circuit 15 in a set division ratio. The CPU 11 may change the setting of division ratio.

The timer circuit 17 counts the current date and time by counting pulse signals of a certain frequency (which may be the same frequency as that of the clock signal) input from the divider circuit 16, and holds them. The CPU 11 can modify the date and time counted by timer circuit 17 based on current date and time information which is retrieved by the communicator 21 from an external electronic device.

The CPU 11, the RAM 12, the oscillator circuit 15, the divider circuit 16, and the timer circuit 17 are included in a personal computer 10. The RAM 12, the oscillator circuit 15 (especially the oscillator) and the like may be external to the personal computer 10.

The communicator 21 controls transmission and reception of radio waves and processing of data in communication with external electronic devices via an antenna Al based on a communication standard. As described above, the communicator 21 includes a first communicator 211 for BT and a second communicator 212 for BLE.

The memory 22 stores programs 221 and setting data for various kinds of control. The memory 22 is, for example, a non-volatile memory such as a flash memory. The memory 22 stores the connection information table 222 as setting data. The connection information table 222 includes table data of identification information and setting information (pairing data and bonding data; hereinafter, pairing and bonding together are referred to as "pairing") of external electronic devices. The identification information and the setting information are used in communication with external electronic devices including the terminals 500 via the communicator 21. The pairing data includes, for example, data of a private key for connection, and information of operation intervals in connection.

The operation interface 23 accepts input operation from outside, such as user operation. The operation interface 23 includes a touch panel superimposed on the display screen 242, and outputs information on a position and time length of touch operation as operation signals to the CPU 11. The operation interface 23 may include a push button switch or a rotation switch.

The display 24 displays various kinds of information based on control of the CPU 11. The display 24 includes a display driver 241 and a display screen 242. The display screen 242 performs digital display and is, for example, a liquid crystal display screen (LCD) of a dot matrix type. The display driver 241 outputs a drive signal that makes the display screen 242 perform display to the display screen 242 based on a control signal from the CPU 11. The display 24 may include an LED lamp for notification.

The power supply 30 supplies power from the battery 31 to parts of the electronic device 100, such as the personal computer 10, at a predetermined driving voltage. In the embodiment, the electronic device 100 includes a battery 31 which is, for example, a rechargeable battery which is connected to an external power source to be charged. Alternatively, a replaceable dry battery, rechargeable battery, etc. may be used.

Figures 3, 4:
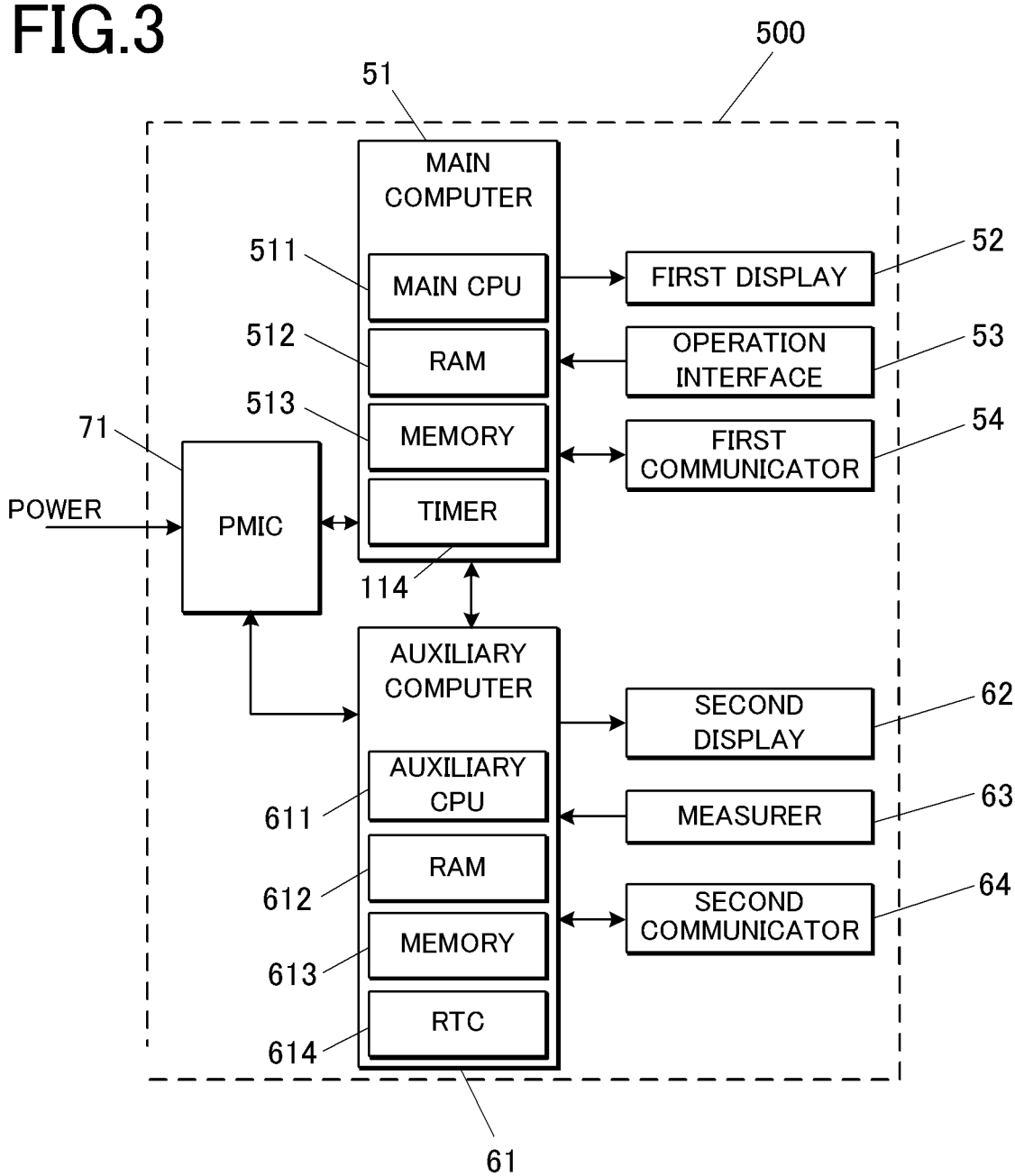
FIG. 3 is a block diagram illustrating functional configuration of a smart watch according to the embodiment.
FIG. 4 is a table showing an example of contents of a connection information table.

FIG. 3 is a block diagram illustrating functional configuration of the terminal 500 according to the embodiment.

The terminal 500 includes a main computer 51, a first display 52, an operation interface 53, a first communicator 54, an auxiliary computer 61, a second display 62, a measurer 63, a second communicator 64, and a PMIC (Power Management IC) 71.

The main computer 51 is a main controller and includes a main CPU 511, RAM 512, memory 513, and a timer 514. The main computer 51 is powered by a power supply via the PMIC 71, and controls operations of the first display 52, the operation interface 53, the first communicator 54, and the like.

The main CPU 511 performs arithmetic processing of various kinds, and comprehensively controls operations of the terminal 500 in a normal operation condition. Operation of the main CPU 511 can temporarily stop automatically or in response to predetermined input operation when no operation is required. In that case, contents stored in the RAM 512 may be kept (standby) or be moved to the memory 513 (pause).

The RAM 512 provides the main CPU 511 with working memory space and stores temporary data. As described above, while the main CPU 511 is in a standby state, operation of the RAM 512 (update operation) is continued. When the main CPU 511 enters a pause state, contents stored in the RAM 512 is copied to memory 513. Operation of the RAM 512 and operation of the main CPU 511 stops together.

The memory 513 is non-volatile memory such as flash memory, and stores a control program (including various application programs (applications)) executed by the main CPU 511, setting data, etc. The data stored in the memory 513 includes operation settings of applications for various functions and historical data generated in accordance with operation.

The timer 514 counts the current date and time based on control of the main CPU 511. The timer 514 includes a counter, and counts dates and time with higher accuracy than that of the RTC 614, which will be described later, based on operation clock frequency of the main computer 51.

The first display 52 performs display mainly under the control of the main computer 51 (main CPU 511) and is turned off while the main computer 51 is in a pause state. The first display 52 includes, for example, a full-color liquid crystal screen, and performs display for various functions.

The operation interface 53 includes, for example, a touch panel and accepts input operation from the outside. The operation interface 53 converts operation into an electrical signal and outputs it to the main CPU 511. If operation is input to the touch panel while the main CPU 511 is in a pause or standby state, the electrical signal serves as a resumption signal, and the main CPU 511 resumes operation.

The first communicator 54 controls wireless communication with external electronic devices. Communication standards that can be used for the first communicator 54 include BT. The first communicator 54 may be capable of communicating in a wireless LAN (IEEE 802.11) or the like. External electronic devices to be connected include the electronic device 100, and may include others. The first communicator 54 operates under the control of the main CPU 511, and stops operation when the main CPU 511 shifts to a pause or standby state.

The auxiliary computer 61 includes an auxiliary CPU 611, RAM 612, memory 613, and an RTC (Real Time Clock) 614. The auxiliary computer 61 operates while being powered by a power supply via a PMIC 71. The auxiliary computer 61 controls operation of the second display 62, the measurer 63, and the second communicator 64. The auxiliary computer 61 may be capable of communicating with the main computer 51. Power consumption in normal operation and maximum power consumption of the auxiliary computer 61 are lower than those of the main computer 51. The power consumption is mainly based on TDP (thermal design power) of the CPU. The capacity and the number of the RAM may be taken into account. The auxiliary computer 61 is a controller for continuous operation with relatively low power consumption.

The auxiliary CPU 611 performs arithmetic processing of various kinds and comprehensively controls operation of the auxiliary computer 61. Power consumption of the auxiliary CPU 611 may be lower than that of the main CPU 511 (comparison based on TDP, etc.) so that performance of the auxiliary CPU 611 is poorer than that of the main CPU 511. The auxiliary CPU 611 basically keeps minimum operation of the terminal 500 as long as enough power is supplied from the PMIC 71. In a case in which minimum operation is periodically performed at predetermined intervals, the auxiliary CPU 611 may stop operation to be in a standby state while the minimum operation is not performed.

The RAM 612 provides the auxiliary CPU 611 with working memory space and stores temporary data. Even in the above case in which the auxiliary CPU 611 operates intermittently, the RAM 612 keeps stored data as long as power is normally supplied from the PMIC 71.

The memory 613 is a non-volatile memory such as a flash memory, and stores control programs (including various applications) executed by the auxiliary CPU 611, setting data, etc.

The RTC 614 performs clocking operation for time. Accuracy in the clocking operation of the RTC 614 is lower than that of the timer 514 of the main computer 51, as described above. On the other hand, power consumption of the RTC 614 in the clocking operation is lower than that of the timer 514. The RTC 614 continues to count dates and time even when, for example, the main computer 51 and the auxiliary computer 61 stop.

Power consumption of the second display 62 is lower than that of the first display 52 as described above. The second display 62 includes, for example, a monochrome liquid crystal screen. In display operation, the second display 62 may display simple notification in addition to minimum display such as time display. The display screen of the second display 62 may be automatically updated. The auxiliary computer 61 outputs image data which is updated only when display contents change, such as when time changes, to the second display 62.

The measurer 63 includes a sensor that measures physical quantity indicative of a motion state of the terminal 500. The measurer 63 includes, for example, an accelerometer, and may further include an azimuth sensor (geomagnetic field sensor) and a barometer (used as an altitude sensor). The measurer 63 includes an inclination sensor that detects a particular inclination of the terminal 500. In the embodiment, the inclination sensor detects an inclination of the terminal 500 when a user raises an arm in front of eyes to look at a display screen of the terminal 500. The main computer 51 may control operation of the measurer 63 and obtain data.

The second communicator 64 controls wireless communication with external electronic devices. Communication standards that can be used for the second communicator 64 include BLE. The second communicator 64 operates to receive a small amount of limited communication data (usually in fixed form) while the auxiliary computer 61 is in operation (pause or standby period of the main computer 51). The second communicator 64 may stop while the main CPU 511 and the first communicator 54 are in operation. The second communicator 64 operates under the control of the auxiliary CPU 611 as needed in a pause or standby period of the main CPU 511 and the first communicator 54. The first communicator 54 and the second communicator 64 of the terminal 500 are independent and have different BD addresses (identification information also called MAC addresses).

The main CPU 511 and the auxiliary CPU 611 constitute a communication controller in the embodiment.

The PMIC 71 controls supply of power to the main computer 51 and the auxiliary computer 61 from a power supply.

The PMIC 71 includes:
a switch that switches output of power to the main computer 51 and the auxiliary computer 61; and
a DC/DC converter that adjusts an output voltage or the like.

The PMIC 71 supplies appropriate power to the main computer 51 and the auxiliary computer 61 in operation.

Next, operation modes and display operation of the terminal 500 will be described.

The terminal 500 includes operation conditions having different power consumption, for example, in the embodiment, a normal operation mode (first operation condition) and a power saving mode (second operation condition). In the normal operation mode, the main computer 51 operates normally. In the power saving mode, the main computer 51 enters a pause or standby state while the auxiliary computer 61 operates with less power than that of the main computer 51.

The terminal 500 enters the power saving mode when the terminal 500 determines that the terminal 500 is not used by a user for more than a reference time. When the terminal 500 detects any use, the terminal 500 exits the power saving mode. The state in which the terminal 500 is not used is a state in which any of, for example, acceptance of operation by the operation interface 23, detection of movement by the measurer 63, such as detection of acceleration and detection of change in posture, and the like does not occur.

The terminal 500 can display a predetermined notification received from the electronic device 100. In the normal operation mode, the first display 52 may display details received by the first communicator 54. In the power saving mode, the second display 62 may display minimum information, such as a kind of notification, received by the second communicator 64 with a predetermined sign or the like. In a case in which the second communicator 64 receives preset important information or the like, the terminal 500 may return to the normal operation mode. In that case, the first communicator 54 again receives details of the important information, and makes the first display 52 display them.

Communication operation between the electronic device 100 and the terminal 500 will be described.

As described above, the terminal 500 switches between BT and BLE in accordance with an operation condition of the main computer 51. While the main computer 51 is in operation, the terminal 500 uses BT. While the main computer 51 is in a pause state and the auxiliary computer 61 is in operation, the terminal 500 uses BLE.

When the main computer 51 enters the standby or pause state and when the main computer 51 resumes operation, the electronic device 100, which is the host device, needs to change a connection target. The connection information table 222 of the memory 22 stores and keeps association of pairing information of the first communicator 54 and pairing information of the second communicator 64 of one terminal 500 for which connection and disconnection is switched. The pairing information includes identification information. When connection of one communicator is cut off, the CPU 11 refers to the connection information table 222 to specify identification information of the other one to be connected. Connection is established quickly.

FIG. 4 is a table showing an example of contents of the connection information table 222.

A group ID is set for each terminal, such as the terminal 500. In a case in which terminals can communicate in multiple communication systems, BD addresses respectively associated with the communication systems are also kept in association with one group ID. When a communication standard for the terminal 500 is switched from one standard (current standard) to another standard (next standard), the CPU 11 refers to the connection information table 222. The CPU 11 obtains identification information of a communicator for the next standard to specify a communicator to be connected. It eliminates need to, for example, attempt to establish connection with an irrelevant device based on other pairing information kept in the connection information table 222. It saves time.

Figure 5:
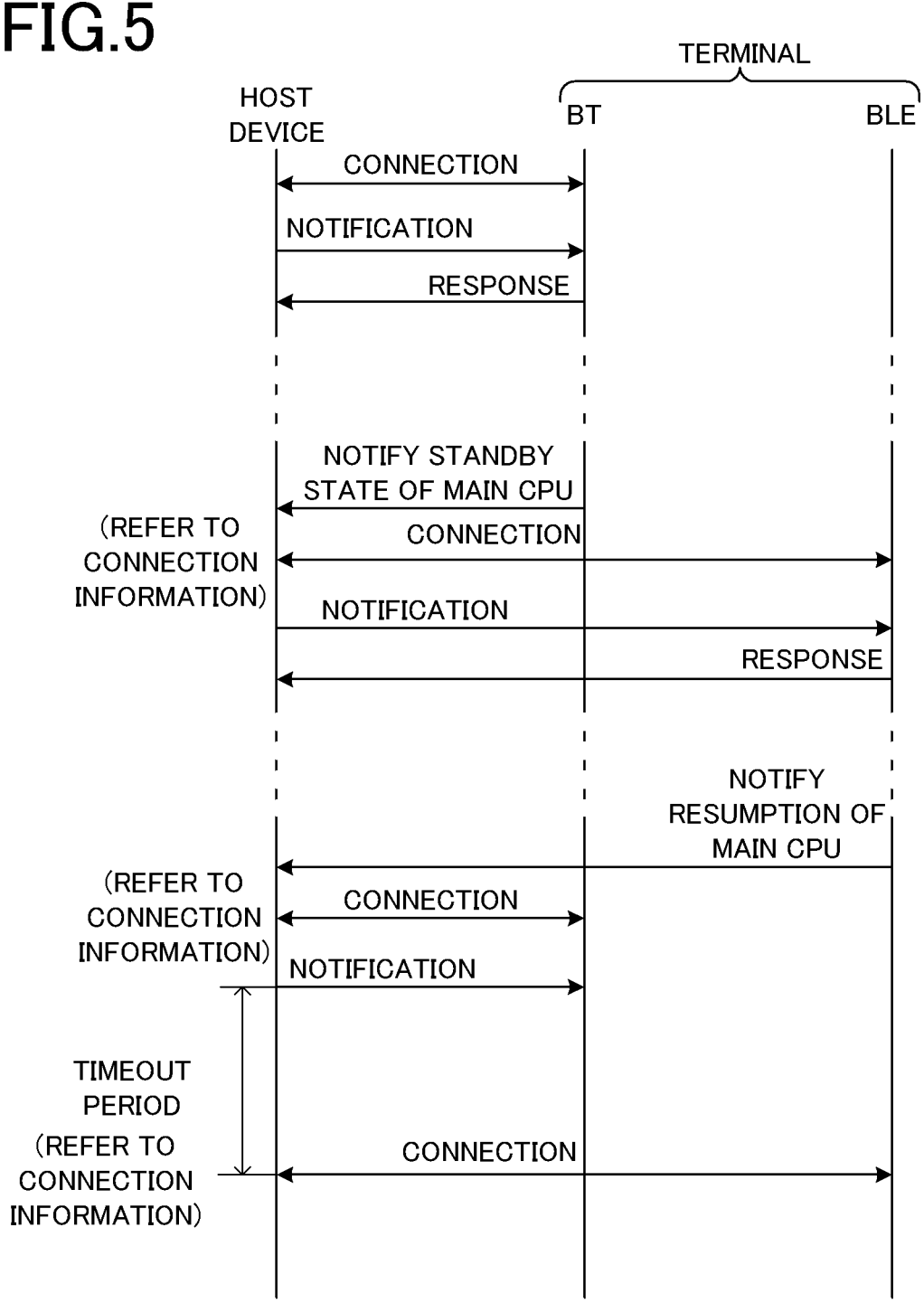
FIG. 5 is a flow chart illustrating communication between a host device and a terminal.

FIG. 5 is a flow chart illustrating communication between a host device (the electronic device 100 in the embodiment) and a terminal (the terminal 500 in the embodiment).

First, usually, the host device requests BT (first communicator 54) of the terminal to connect. The terminal (first communicator 54) accepts the request, and connection is established. The host device then sends notification to the terminal as needed. If there is information to be sent from the terminal to the host device, the host device may request the terminal to send the information.

When the main CPU 511 of the terminal shifts to a pause or standby state, the terminal sends the host device notification that the main CPU 511 has stopped operation (i.e., information of switching from BT to BLE). After the host device receives this communication, the host device refers to the connection information table 222 to identify and obtain identification information of a BLE communicator (next communicator) paired with identification information of a BT communicator (current communicator) of the terminal. Then, the host device quickly identifies a radio wave from the BLE communicator of the terminal using the obtained identification information and establishes connection. Then the host device can send simple notification or the like to the terminal via BLE.

In a case in which communication in BT and communication in BLE can be performed simultaneously, connection in BT may be cut off after connection in BLE is made. In a case in which communication in BT and communication in BLE cannot be simultaneously performed, connection in BT may be cut off just before connection in BLE is established.

When the main CPU 511 resumes operation, the terminal sends notification about resumption of operation of the main CPU 511 to the host device in BLE. In response to this, the host device refers to the connection information table 222 to identify and obtain connection information of the BT communicator paired with connection information of the BLE communicator of the terminal. The host device then selects the BT communicator of the terminal based on obtained connection information and immediately transmits a request for connection. Thus, the terminal establishes connection with the host device in BT as soon as the main CPU 511 and the first communicator 54 resume operation. Connection in BLE may be cut off after connection in BT is established, or right before the connection.

In a case in which there is no notification about stop of the main CPU 511 and in which the first communicator 54 does not respond to transmission of the host device, the host device may send a request for connection in BLE after a timeout period passes. In a case in which the main CPU 511 has stopped operation and the communication standard has been switched to BLE, the host device switches to communication in BLE. While the main CPU 511 does not stop operation, connection in BLE is not established. Therefore, the host device repeats transmission in BT after a standby period passes. For example, in a case in which communication is temporarily interrupted not because of stop of the main CPU 511 but because of distance between the host device and the terminal, communication is resumed when it becomes possible to catch a radio wave of communication in BT.

Figure 6:
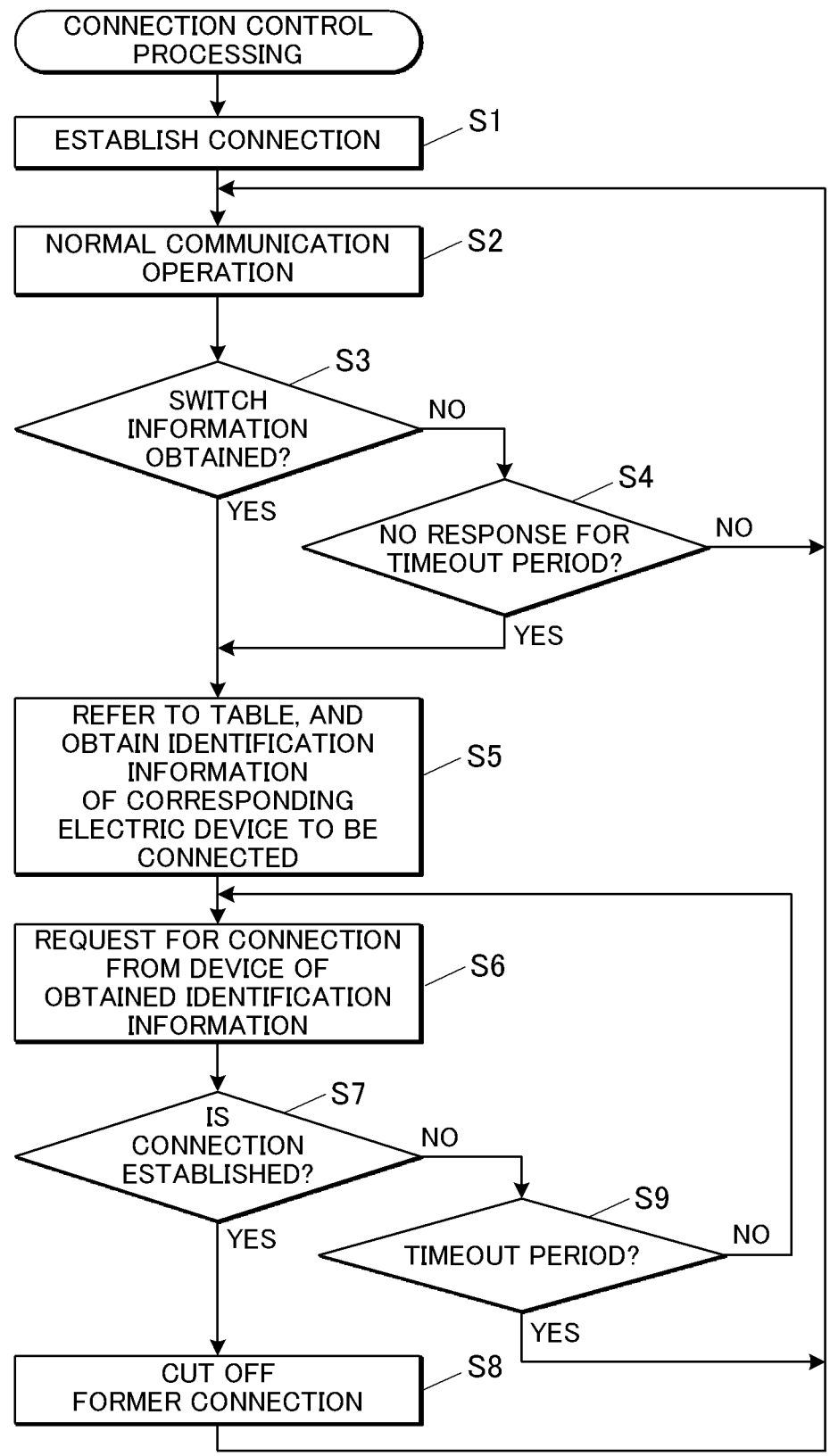
FIG. 6 is a flow chart illustrating control procedure of connection control processing performed in the electronic device.

FIG. 6 is a flow chart illustrating control procedure of the CPU 11 in connection control processing performed in the electronic device 100.

The connection control processing includes a connection control method of the embodiment and is continuously activated, for example, by invocation of a communication control application (the program 221 in the embodiment) installed in the electronic device 100.

When the connection control processing begins, the CPU 11 establishes connection with the terminal 500 (Step S1). Usually, at this time, the CPU 11 is connected to the first communicator 54 for BT. Also in this case, the CPU 11 may refer to the connection information table 222.

The CPU 11 periodically performs normal communication (Step S2). This communication includes transmission and reception of only control signals to maintain connection.

The CPU 11 determines whether the CPU 11 has obtained from the terminal 500 information of switch between operation of the main computer 51 and operation of the auxiliary computer 61 (Step S3). In a case in which the CPU 11 determines that the CPU 11 has obtained the information of switch ("YES" in Step S3), processing of the CPU 11 proceeds to Step S5.

In a case in which the CPU 11 determines that the CPU 11 has not obtained the information of switch ("NO" in Step S3), the CPU 11 determines whether a period during which the CPU receives no signal from the terminal 500 is equal to or longer than a predetermined timeout period (Step S4). In a case in which the CPU 11 determines that the period during which the CPU receives no signal is less than the predetermined timeout period ("NO" in Step S4), processing of the CPU 11 returns to Step S2. In a case in which the CPU 11 determines that the period during which the CPU receives no signal is equal to or longer than the predetermined timeout period ("YES" in Step S4), processing of the CPU 11 proceeds to Step S5.

After processing proceeds from Step S3, S4 to Step S5, the CPU 11 refers to the connection information table 222, and identifies and obtains a BD address of a communicator of the terminal 500 to be connected (Step S5). The CPU 11 requests the communicator identified by the obtained BD address to connect (Step S6). The CPU 11 determines whether connection is established (Step S7). In a case in which the CPU 11 determines that connection is established ("YES" in step S7), the CPU 11 cuts off the former connection (Step S8). Then, processing of the CPU 11 returns to Step S2.

In a case in which the CPU 11 determines that connection is established ("NO" in Step S7), the CPU 11 determines whether a factor in the request for connection in Step S6 is that there is no response for more than a timeout period in Step S4 (Step S9). In a case in which the CPU 11 determines that the factor is that there is no response for more than a timeout period ("YES" in Step S9), the CPU 11 does not switch connection, and processing returns to Step S2. In a case in which the CPU 11 determines that the factor is not that there is no response for more than a timeout period but obtainment of the information of switch ("NO" in Step S9), processing of the CPU 11 returns to Step S6. The CPU 11 may have a standby time before processing of Step S6. Processing of Steps S5, S6 is a connection step in the embodiment.

FIG. 7 is a flow chart illustrating control procedure of the CPU 11 in connection information obtainment processing for generating and updating the connection information table 222. The connection information obtainment processing is performed when the electronic device 100 connects with a new terminal 500 or the like for the first time, i.e., when the electronic device 100 does not have identification information of the first communicator 54 and the second communicator 64 of the terminal 500.

When the connection information obtainment processing begins, the CPU 11 requests the terminal 500 to connect, and establishes connection (Step S41). The CPU 11 obtains identification information of the first communicator 54 and pairing information from the terminal 500 (Step S42).

The CPU 11 determines whether there is another communicator based on the pairing information (Step S43). The application estimates the number and kinds of communicators included in the terminal 500 by obtaining model information of the terminal 500 (Step S43). If it is difficult to estimate, the CPU 11 may assume that there is another communicator and proceed with further processing. The CPU 11 determines whether the terminal 500 includes a communicator in addition to the currently connected communicator (Step S44).

In a case in which the CPU 11 determines that the terminal 500 includes another communicator ("YES" in Step S44), the CPU 11 requests identification information of the other communicator from the currently connected communicator (Step S45). The CPU 11 obtains the identification information of the other communicator (Step S46). Then, processing of the CPU 11 proceeds to Step S47. In a case in which the CPU 11 determines that the terminal 500 does not include any other communicator ("NO" in Step S44), processing of the CPU 11 proceeds to Step S47.

When the processing proceeds from Step S44, S46 to Step S47, the CPU 11 associates obtained one or more pieces of identification information with the device, and stores association in the connection information table 222 (Step S47: information obtainment step). The CPU 11 then terminates the connection information obtainment processing. The CPU 11 may cut off connection with the currently connected communicator.

FIG. 8 is a table showing another example of the connection information table 222.

BD addresses may not be fixed and may be changed. In a case in which BD addresses are used one by one, all the BD addresses may be obtained as identification information in advance and stored in the connection information table 222. In a case in which information indicating which of the BD addresses will be used is specified in switching between operation modes or is selected in accordance with switching time, e.g., a date, the CPU 11 can select and specify an appropriate BD address to request for connection.

As described above, the electronic device 100 according to the embodiment includes the communicator 21 and the CPU 11. The communicator 21 wirelessly communicates with the first communicator 54 of the terminal 500 in BT, and wirelessly communicates with the second communicator 64 of the terminal 500 in BLE. The CPU 11 obtains association between identification information (a BD address in the embodiment) of the first communicator 54 and a BD address of the second communicator 64. To switch a current communicator which is one of the first communicator 54 and the second communicator 64 of the terminal 500 to a next communicator which is the other of the first communicator 54 and the second communicator 64, the CPU 11 specifies a BD address of the next communicator based on the association, and establishes connection with the next communicator using the BD address of the next communicator.

Thus, in a case in which a communication partner includes multiple communicators and either is selectively used depending on the situation, the association of the BD addresses of the communicators is obtained. As a result, when connection targets are switched, a radio wave from a connection target to be connected next is specified easily and quickly, and connection is established. It reduces disconnection time. If the information is not kept, sometimes connection with another terminal having a pairing setting is made based on received advertisement or the like. Unnecessary connection wastes power. Establishment and cutting of unnecessary connection waste time. However, the electronic device 100 communicates with the terminal 500 efficiently and nearly continuously.

Separate operations for multiple wireless communications are sometimes performed. In some cases, when one wireless communication is switched to another wireless communication, an electronic device of a communication partner does not know a connection target in the other wireless communication. It is not possible to select and connect to a desired connection target immediately. It brings a problem of disconnection. However, the embodiment achieves more continuous communication with a particular electronic device.

After the CPU 11 receives switch information from the terminal 500, the CPU 11 obtains the BD address of the next communicator and establishes connection with it. In a case in which the terminal 500 switches between communication standards, the communication standards are switched immediately after such notification is received. Therefore, even if the terminal 500 does not have a standby period or the like, communication is performed almost continuously.

The terminal 500 has the normal operation mode and the power saving mode as operation conditions of different power consumption. The switch information includes information about switching between operation conditions. The connection target is quickly switched when the terminal 500 enters a power saving mode to communicate in a standard that saves power, and vice versa. Accordingly, when the terminal 500 quickly enters the power saving mode or quickly switches to various operations, connection is almost continued appropriately.

The electronic device 100 includes the memory 22 that stores the BD address of the first communicator 54 and the BD address of the second communicator 64 which are associated with each other. The memory 22, particularly non-volatile memory, keeps the association so that information is permanently available once it is registered. It reduces effort in subsequent connection.

In a case in which the CPU 11 communicates with the first communicator 54 when the CPU 11 does not have the BD address of the first communicator 54 or the BD address of the second communicator 64, the CPU 11 communicates with the first communicator 54 to obtain the BD address of the first communicator 54 and the BD address of the second communicator 64. That is, when the CPU 11 connects with the terminal 500 for the first time, the CPU 11 obtains the BD addresses of the first communicator 54 and the second communicator 64 together through communication with the first communicator 54. Thereby the CPU 11 specifies information of association between communicators in the terminal 500. It eliminates effort of obtaining information separately from each communicator. It brings rapid switching in subsequent connection.

The two communication standards may be Bluetooth Classic and Bluetooth Low Energy. Although both of them are standards for short-range wireless communication, they are very different in characteristics, especially in the amount of data transmission and power consumption. Using them for different circumstances brings efficient communication. Smooth switching between communication standards brings almost continuous communication and almost real-time interaction.

Separate operations for multiple wireless communications are sometimes performed. In some cases, when one wireless communication is switched to another wireless communication, an electronic device of a communication partner does not know a connection target in the other wireless communication. It is not possible to select and connect to a desired connection target immediately. It brings a problem of disconnection. However, the embodiment achieves more continuous communication with a particular electronic device.

The electronic device 100 is a mobile phone. When a multi-functional mobile phone transmits various information to the terminal 500, and analyzes and displays data obtained by the terminal 500, communication is continued through smooth switching.

The terminal 500 according to the embodiment includes:
the first communicator 54 that communicates in BT;
the second communicator 64 that communicates in BLE;
the main CPU 511 of the main computer 51; and
the auxiliary CPU 611 of the auxiliary computer 61.

In a case in which the electronic device 100 requests a BD address of the second communicator 64 while the first communicator 54 communicates with the electronic device 100, the main CPU 511 makes the first communicator 54 transmit the BD address of the second communicator 64. Thus, in a case in which two communicators can independently operate, identification information of both communicators is sent together to the connected electronic device 100. Accordingly, unnecessary long disconnection time does not occur even if two communicators are switched flexibly. As a result, necessary information is obtained from the host device at any time, and in addition, necessary information is output to the host device regardless of operation condition, particularly in a small terminal.

The wireless communication system 1 according to the embodiment includes the terminal 500 and the electronic device 100.

The terminal 500 includes:
the first communicator 54 that communicates in the BT standard; and
the second communicator 64 that communicates in the BLE standard.

The electronic device 100 includes:
the communicator 21 which wirelessly communicates with the first communicator 54 in the BT standard and which wirelessly communicates with the second communicator 64 in the BLE standard; and
the CPU 11.

The CPU 11 of the electronic device 100 obtains association between a BD address (identification information) of the first communicator 54 and a BD address of the second communicator 64. When the terminal 500 switches from wireless communication by a current communicator which is one of the first communicator 54 and the second communicator 64 to wireless communication by a next communicator which is the other of the first communicator 54 and the second communicator 64, the terminal 500 identifies a BD address of the next communicator based on the association, and establishes connection with the next communicator using the BD address of it.

The wireless communication system 1 associates pieces of identification information of independent communicators in the terminal 500, and makes the electronic device 100 keep them. Therefore, when the communicators are switched for operation, disconnection time is not long. Connection with a communicator to be connected is established quickly. It reduces effort for connection. Data transmission is not delayed since communication is almost continued.

The embodiment connection control method includes:
obtaining association between a BD address of the first communicator 54 and a BD address of the second communicator 64; and
when a wireless communication partner of the terminal 500 is switched from a current communicator which is one of the first communicator 54 and the second communicator 64 to a next communicator which is the other of the first communicator 54 and the second communicator 64, specifying a BD address of the next communicator based on the association, and establishing connection with the next communicator using the BD address of it.

According to such a connection control method, when the terminal 500 switches communicators, the terminal 500 quickly completes the switching without effort. This connection control method makes disconnection time short. Communication is almost continued during the switching.

The program 221 of the connection control method is installed, and the software controls switching of connection. Disconnection time is easily shortened without adding any special configuration to the hardware. Communication is almost continued during the switching.

The present invention is not limited to the embodiment, and various changes can be made. For example, in the embodiment, switching between the normal operation mode and the power saving mode is given as an example. The present invention is not limited thereto. Communicators may be switched in accordance with more than three operation modes. Operation modes may be determined based on elements other than power consumption. For example, in a case in which data transmission amount varies greatly depending on the function to be executed, switching may be performed in accordance with an appropriate data transmission rate or the like.

In the embodiment, notification of switching between the normal operation mode and the power saving mode is used as notification of switching of communicators. The present invention is not limited thereto. For example, switching of communicators may be notified directly. In a case in which switching is performed in response to another trigger, information of the trigger may be used.

The embodiment illustrates switching between the BT standard and the BLE standard as an example. The present invention is not limited thereto. In a case in which communication in other standards is switched, identification symbols of communicators, such as MAC addresses, may be associated and stored. It realizes quick switching.

The embodiment describes connection between a mobile phone and a smart watch. The present invention is not limited thereto. The present invention can be applied to connection between any two communication devices.

In the embodiment, identification information of the first communicator 54 and identification information of the second communicator 64 are kept together in one connection information table 222. However, pieces of identification information may be kept in separate table data as long as the pieces are associated with each other. For example, first pairing information for communication of the first communicator 211 of the communicator 21 and second pairing information for communication of the second communicator 212 may be kept separately. In that case, in each pairing information, corresponding identification symbol may be given to communicators of one terminal 500. An address in memory or a pointer that indicates position of information of another may be stored. The connection information table 222 may not be stored in the memory 22. A list may be kept in memory in a network, for example, in a cloud.

In the above explanation, the memory 22 having a non-volatile memory is exemplified as a computer readable medium that stores the program 221 of communication control processing for processing operation of the CPU 11 according to the invention. However, the computer-readable medium is not limited to this, and may be an HDD (hard disk drive) or a portable recording medium such as a CD-ROM or a DVD. A carrier wave may be adopted as a medium that provides data of a program according to the invention through a communication line.

Details such as configuration, control or procedure shown in the embodiment may be modified within the scope of the claims.

Although embodiments of the present invention have been described and illustrated in detail, the disclosed embodiments are made for purposes of illustration and example only and not limitation. The scope of the present invention should be interpreted by terms of the appended claims.

What is claimed is:

1. A wireless communication system comprising:
   a first communication device; and
   a second communication device, wherein the second communication device:
      operates in at least two operation modes with different power consumption,
      establishes communication with the first communication device using at least two communication standards,
      comprises (i) a first communicator that communicates using a first communication standard of the at least two communication standards and (ii) a second communicator that communicates using a second communication standard of the at least two communication standards, and
      transmits first operation mode switch information of switching, from a first operation mode of the at least two operation modes, to a second operation mode, the first operation mode having larger power consumption than the second operation mode, is transmitted to the first communication device via communication using the first communication standard in a case where a connection using the first communication standard is established between the first communication device and the first communicator of the second communication device, and wherein the first communication device:
      comprises memory that stores information of correspondence between (i) first information for identifying the first communicator of the second communication device and (ii) second information for identifying the second communicator of the second communication device,
      identifies the second communicator of the second communication device based on the information of correspondence, and
      starts processing for establishing a connection using the second communication standard with the identified second communicator of the second communication device, in a case where the first operation mode switch information is received from the first communicator of the second communication device via communication using the first communication standard.

2. The wireless communication system according to claim 1, wherein:
   in a case where the connection using the second communication standard is established between the first communication device and the second communicator of the second communication device, the second communication device transmits, to the first communication device via communication using the second communication standard, second operation mode switch information of switching from the second operation mode to the first operation mode, and
   in a case where the first communication device receives the second operation mode switch information from the second communicator of the second communication device via communication using the second communication standard, the first communication device (i) identifies the first communicator of the second communication device based on the information of correspondence, and (ii) starts processing for establishing the connection using the first communication standard with the identified first communicator of the second communication device.

3. The wireless communication system according to claim 2, wherein the first communication standard is a first Bluetooth communication standard and the second communication standard is a second Bluetooth communication standard, the first Bluetooth communication standard being older than the second Bluetooth communication standard.

4. The wireless communication system according to claim 1, wherein the first communication standard is a first Bluetooth communication standard and the second communication standard is a second Bluetooth communication standard, the first Bluetooth communication standard being older than the second Bluetooth communication standard.

5. A first communication device comprising:
a communicator that establishes (i) a connection using a first communication standard with a first communicator of a second communication device that operates in at least two operation modes with different power consumption and (ii) a connection using a second communication standard which is different from the first communication standard with a second communicator of the second communication device; and
a memory that stores information of correspondence between (i) first information for identifying the first communicator of the second communication device and (ii) second information for identifying the second communicator of the second communication device,
wherein, in a case where (i) the connection using the first communication standard is established between the first communication device and the first communicator of the second communication device and (ii) first operation switch information of switching, from a first operation mode of the at least two operation modes, to a second operation mode, the first operation mode having larger power consumption than the second operation mode, is received from the second communication device via communication using the first communication standard, the first communication device (i) identifies the second communicator of the second communication device based on the information of correspondence, and (ii) starts processing for establishing the connection using the second communication standard with the identified second communicator of the second communication device.

6. A communication method performed by a first communication device,
wherein the first communication device comprises:
a communicator that establishes (i) a connection using a first communication standard with a first communicator of a second communication device that operates in at least two operation modes with different power consumption and (ii) a connection using a second communication standard which is different from the first communication standard with a second communicator of the second communication device; and
a memory that stores information of correspondence between (i) first information for identifying the first communicator of the second communication device and (ii) second information for identifying the second communicator of the second communication device, and wherein the communication method comprises:
identifying the second communicator of the second communication device based on the information of correspondence; and
starting processing for establishing the connection using the second communication standard with the identified second communicator of the second communication device, in a case where (i) the connection using the first communication standard is established between the first communication device and the first communicator of the second communication device and (ii) first operation switch information of switching, from a first operation mode of the at least two operation modes, to a second operation mode, the first operation mode having larger power consumption than the second operation mode, is received from the second communication device via communication using the first communication standard.

7. A non-transitory computer-readable recording medium storing instructions that, when executed by a processor of a first communication device, cause the first communication device to:
establish (i) a connection using a first communication standard with a first communicator of a second communication device that operates in at least two operation modes with different power consumption and (ii) a connection using a second communication standard which is different from the first communication standard with a second communicator of the second communication device,
wherein the recording medium stores information of correspondence between (i) first information for identifying the first communicator of the second communication device and (ii) second information for identifying the second communicator of the second communication device;
identify the second communicator of the second communication device based on the information of correspondence, and (ii) starting processing for establishing the connection using the second communication standard with the identified second communicator of the second communication device, in a case where (i) the connection using the first communication standard is established between the first communication device and the first communicator of the second communication device and (ii) first operation switch information of switching, from a first operation mode of the at least two operation modes, to a second operation mode, the first operation mode having larger power consumption than the second operation mode, is received from the second communication device via communication using the first communication standard.

* * * * *